May 12, 1970

J. T. MAY 3,511,980

DELTA ROAD OCTANE COMPUTER FOR CONTROLLING THE OCTANE
QUALITY OF A GASOLINE BLEND

Filed Feb. 1, 1967

INVENTOR
JOE TURNER MAY

BY Robert E. Patridge

ATTORNEY

INVENTOR
JOE TURNER MAY
BY Robert E. Patridge
ATTORNEY

United States Patent Office 3,511,980
Patented May 12, 1970

3,511,980
DELTA ROAD OCTANE COMPUTER FOR CONTROLLING THE OCTANE QUALITY OF A GASOLINE BLEND
Joe Turner May, Wilmington, Del., assignor to E. I. du Pont de Nemours and Company, Wilmington, Del., a corporation of Delaware
Filed Feb. 1, 1967, Ser. No. 613,326
Int. Cl. G06g 7/58
U.S. Cl. 235—193          8 Claims

ABSTRACT OF THE DISCLOSURE

Method of continuously controlling the octane quality of a refinery gasoline blend containing at least one component which affects octane quality by controlling the amount of said component in the gasoline blend in response to the delta Road octane number of the blend. Electrical circuitry for a delta Road octane computer and method of producing a delta Road octane voltage signal from delta Research and Motor octane voltage signals.

BACKGROUND OF THE INVENTION

Figure 1:
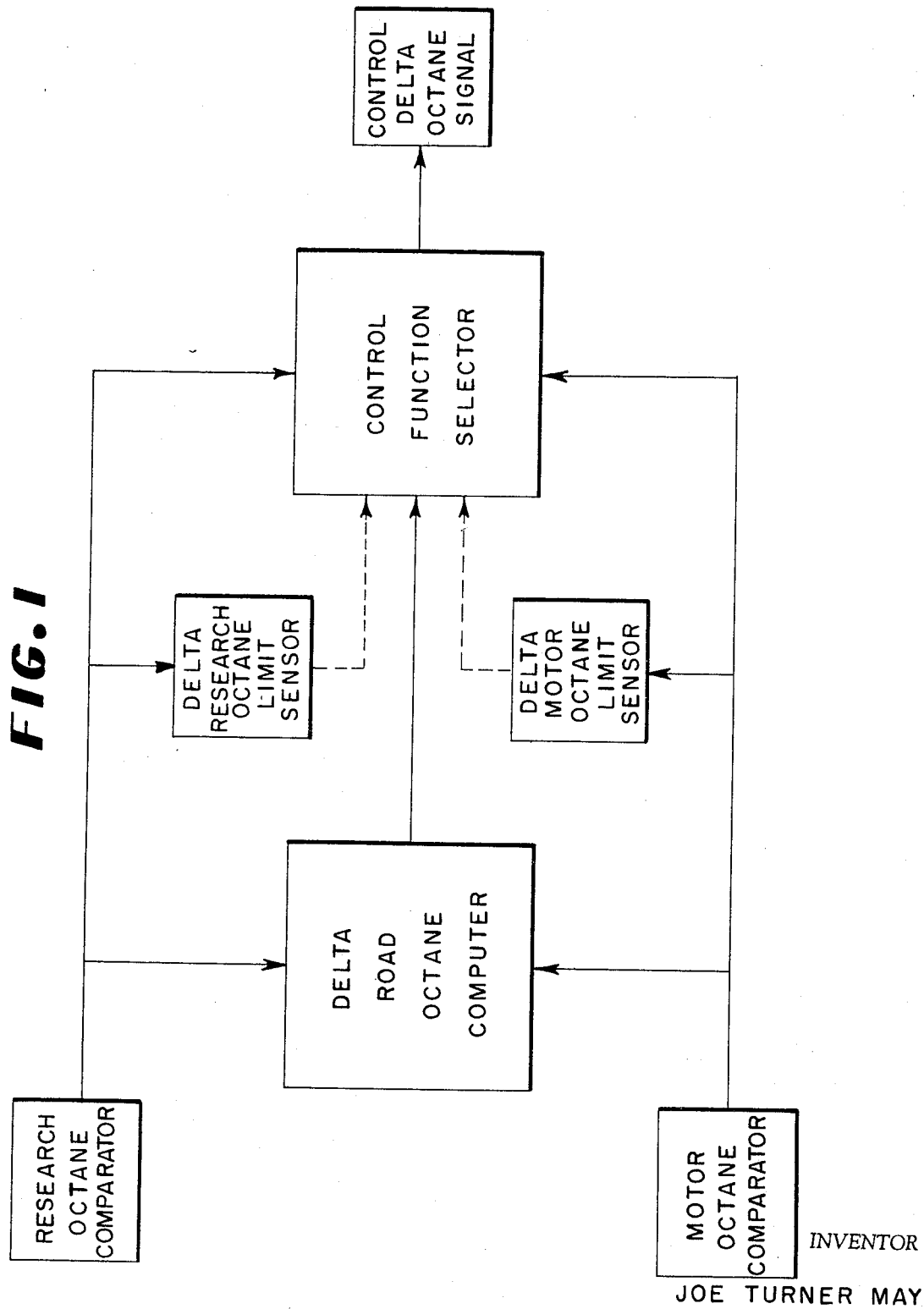

This invention relates to a delta Road octane computer for producing a voltage signal which is useful for controlling the octane quality of a gasoline blend containing at least one component which affects octane quality by controlling the amount of said component in the gasoline blend in response to said voltage signal.

The continuous in-line blending of gasoline components and additives, such as antiknock agents, to make finished gasoline at the refinery has become increasingly popular over the last few years because of the savings resulting from reduced inventories and reduced manpower. It has also been recognized that additional savings can be realized by continuously and accurately measuring the octane quality of the gasoline blend as it comes from the in-line blender.

Until recently, the octane quality of blended line gasoline in refineries was measured by taking frequent samplings from the line downstream from the point of blending and evaluating these samples by American Society for Testing Materials (ASTM) methods D–908–65 or D–1656–65 (Research methods) or D–357–65 or D–1948–65 (Motor methods). The values obtained by these ASTM methods are designated "Research octane number" or "Motor octane number" depending upon the particular operating conditions used. However, the results are often inaccurate and cannot be repeated with a high degree of confidence due to the drift of the test engine between tests and the variation in rating characteristics from one engine to another. Furthermore, the ASTM methods are time consuming and often, because of the long time lag between sampling and results, do not accurately reflect current octane quality.

In U.S. application Ser. No. 410,129, filed Nov. 10, 1964, R. A. Hoffman describes a method of monitoring and controlling the octane quality of gasoline using an octane comparator which compares the knock intensity of the line gasoline with the knock intensity of a prototype gasoline. This difference in knock intensity between the two gasolines is converted to a difference in octane quality known as "delta octane number." If the engine operating conditions approximate those specified by the ASTM Research method, the difference in octane quality is called "delta Research octane number"; if the engine operating conditions approximate those specified by the ASTM Motor method, the difference is called "delta Motor octane number." The octane quality of a gasoline blend containing at least one component which affects octane quality is controlled by controlling the amount of said component in the blend in response to the delta Research or Motor octane number of the blend.

It is also known that better performing gasolines are made by blending in response to a third octane value known as "Road octane number." This octane value is determined by testing the gasoline in a fleet of production model automobiles using the techniques advocated by the Coordinating Research Council (CRC). Since this test method is even more cumbersome than the ASTM methods, Road octane number is generally calculated from the Research and Motor octane numbers. The Road octane number (UON) of gasoline has been found to correlate with the Research octane number (RON) and the Motor octane number (MON) for any given gasoline in accordance with the general equation $$UON = a(RON) + b(MON) + C$$

where $a$ is the Research octane coefficient, $b$ is the Motor octane coefficient, and $C$ is a constant. Coefficients $a$ and $b$ and constant $C$ can be determined by the CRC method for the gasoline of any particular refinery.

In the Oil and Gas Journal, vol. 63, No. 43, pp. 134–138 (Oct. 25, 1965), J. E. Riegel describes the concept of computing the delta Road octane number of gasoline from its delta Research and Motor octane numbers and controlling the octane quality of the gasoline in response to its delta Road octane number. The subject of the present invention is a delta Road octane computer which is useful for controlling the octane quality of gasoline as described by Riegel.

DESCRIPTION OF THE INVENTION

The delta Road octane computer of this invention comprises a variable attenuator for attenuating a delta Research octane voltage signal, a buffer amplifier for amplifying the attenuated delta Research octane voltage signal, a variable attenuator for attenuating a delta Motor octane voltage signal, a buffer amplifier for amplifying the attenuated delta Motor octane voltage signal, an independently variable voltage source, a Road octane summing amplifier for algebraically summing the attenuated and amplified delta Research and Motor octane voltage signals and the independently variable voltage signal, and an output terminal for receiving the output signal of the Road octane summing amplifier.

The delta Road octane computer of this invention is useful for controlling the octane quality of gasoline blends containing at least one component which affects octane quality by controlling the amount of said component in the gasoline in response to a voltage signal produced by the delta Road octane computer. The gasoline component which affects octane quality may be an antiknock agent such as tetramethyl lead, tetraethyl lead, dicyclopentadienyl iron and related compounds disclosed by Pedersen in U.S. application Ser. No. 370,286, filed July 27, 1953, or it may be a gasoline blending component such as alkylate or reformate.

Figure 2:
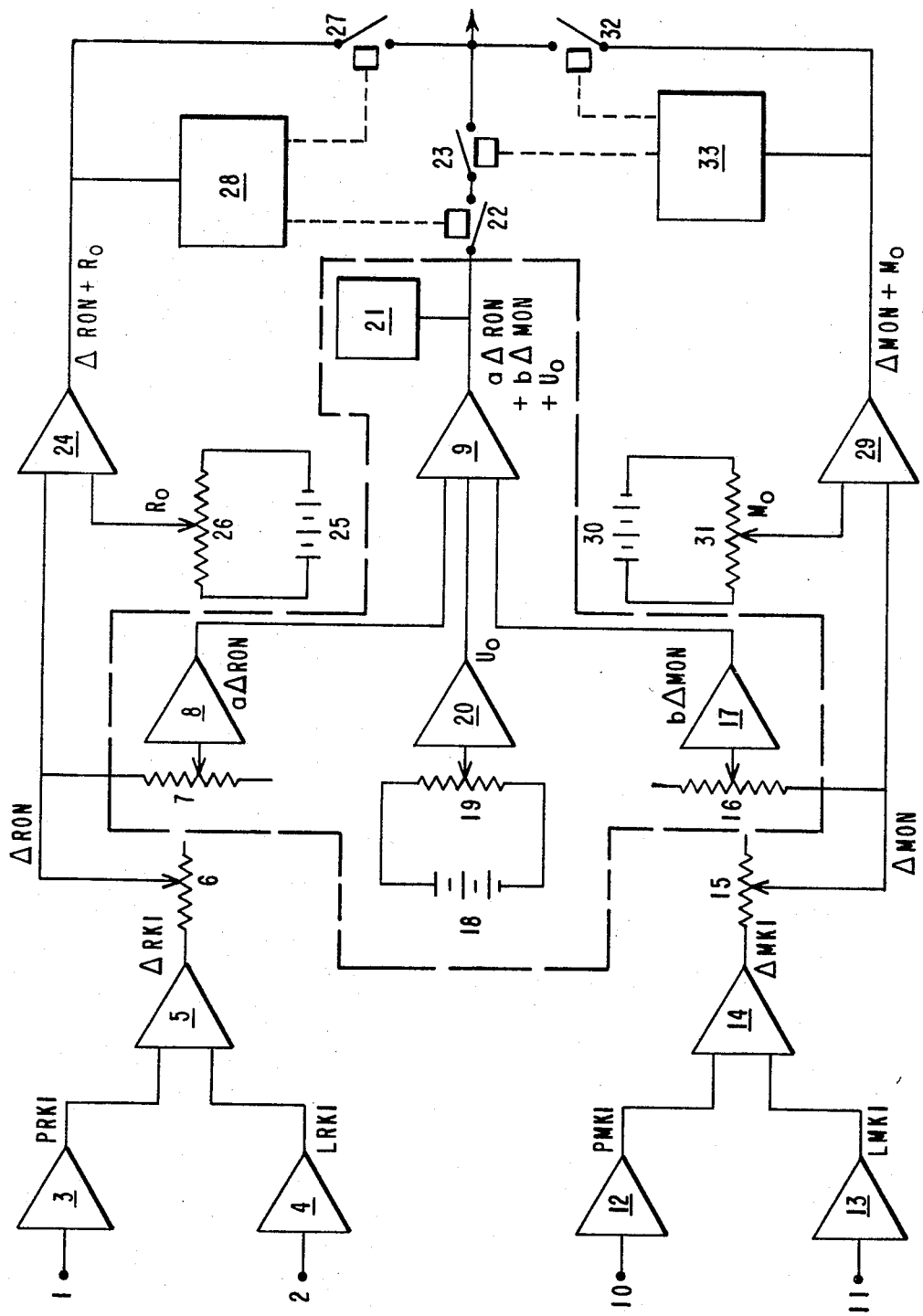

The delta Road octane computer of the present invention can be more readily understood by referring to the accompanying drawings. FIG. 1 represents a block diagram illustrating the method of controlling the octane quality of gasoline using the computer of this invention. FIG. 2 is an electrical circuit diagram illustrating the computer of this invention.

Referring now to FIG. 1, a Research octane comparator and a Motor octane comparator are used to send voltage signals to the delta Road octane computer of this invention. Suitable octane comparators are described by Hoffman in U.S. application Ser. No. 410,129, filed Nov. 10, 1964. Briefly, the octane comparator operates by measuring alternately at frequent intervals the knock intensities of a line gasoline of unknown octane quality and the knock intensity of a prototype gasoline of known octane quality using an ASTM knock engine equipped with a single spill-type carburetor of low gasoline hold-up adapted to alternately carburet the two gasolines using the same air to fuel ratio adjustment. In one of the comparators the knock engine operates under conditions approximating the Motor method while in the other the engine operates under conditions approximating the Research method.

The engine knock intensities alternately obtained from the two gasolines in each comparator are converted to a delta octane number. The delta Research octane number ($\Delta RON$) and the delta Motor octane number ($\Delta MON$) obtained in this manner are sent to a delta Road octane computer which computes the delta Road octane number ($\Delta UON$) of the line gasoline in accordance with the general equation $\Delta UON = a\Delta RON + b\Delta MON + U_o$, in which $U_o$ is the Road octane offset. The Road octane offset is necessary to adjust the delta Road octane number when the target Road octane number is not the same as the Road octane number calculated from the Research and Motor octane numbers of the prototype gasolines.

Although it is most desirable to control the octane quality of gasoline blends using Road octane number, this, by itself, does not guarantee production of the best performing gasoline. In usual practice, refinery gasolines contain straight run and/or cracked gasoline fractions as well as alkylate and reformate. Certain changes in the various components of gasoline blends such as increasing the amount of reformate while decreasing the amount of alkylate have the effect of increasing the Research octane number of the blend and decreasing its Motor octane number without significantly affecting its Road octane number. Accordingly, when controlling the blending operation to a Road octane number specification, it is advisable to monitor the Motor octane number and the Research octane number so that they can be maintained within specified limits.

Using the delta Road octane computer of the present invention, it is possible to not only control the blending operation to a Road octane number specification, but optionally the computer can also be used to monitor the Motor octane number and the Research octane number of the line gasoline and switch control of the blending operation to one of these octane quality values should it reach its present limit. This is accomplished by sending the delta Motor and Research octane numbers to the delta Motor and Research octane limit sensors, respectively. These delta octane limit sensors can be adjusted to detect when a specified delta Motor or Research octane number has been reached. When the limit sensor determines that the delta octane number which it is monitoring has reached its preset limit, the limit sensor signals the control function selector which then switches control of the blending operation to the delta octane number which has reached its limit. When the blending operation is being controlled by a delta Motor or Research octane number which has reached its limit, this may cause the Road octane number of the gasoline blend to deviate from specification. For example, if a minimum limit is set for the Research octane number and this value reaches the limit thereby causing control of the blending operation to switch to the delta Research octane number, the Road octane number of the line gasoline may rise above specification. Corrective measures are then taken in the refinery operation to bring the product back into specification, after which the control function selector is manually reset to return control of the blending operation to the delta Road octane number.

The particular method of using the delta octane number voltage signal produced by the delta Road octane computer of this invention to adjust the octane quality of the line gasoline in the blending operation is well known to those skilled in the art and is not within the scope of this invention. Obviously the voltage signal may be used to control the amount of any component affecting octane quality in the line gasoline.

Referring now to FIG. 2, the periodically available prototype and line gasoline Research knock intensity voltage signals are introduced at 1 and 2, respectively, and converted to continuous voltage signals. The conversion takes place in memory amplifiers 3 and 4 which are typical sample and hold circuits well known to those skilled in the art. Each of these amplifiers contains a gate controlled by the timing mechanism described in the Hoffman application for sampling the periodically available knock intensity signal near the end of the knock intensity cycle and holding it for continuous delivery until a new sample is taken during the succeeding knock intensity cycle. The continuous prototype gasoline Research knock intensity signal (PRKI) and the continuous line gasoline Research knock intensity signal (LRKI) are sent to differential amplifier 5 which produces a delta knock intensity voltage signal representative of the algebraic difference between the prototype gasoline Research knock intensity voltage signal and the line gasoline Research knock intensity voltage signal. This delta Research knock intensity signal ($\Delta RKI$) is then sent to variable attenuator 6 which may be any variable attenuating means such as a variable resistor. Variable attenuator 6 attenuates the delta Research knock intensity voltage signal by a factor necessary to convert it to a delta Research octane number voltage signal ($\Delta RON$). This factor is predetermined by feeding two primary reference fuels of known but different octane numbers into the Research knock intensity engine and comparing their knock intensities thereby determining the difference in knock intensity representing one octane number. Variable attentuator 6 is then adjusted until the voltage passing through is equal to the voltage desired to represent the octane number difference between the two primary reference fuels. The octane number range of the primary reference fuels used in this calibration must bracket the octane number range in which the octane comparator is operated.

The delta Research octane number voltage signal ($\Delta RON$) from variable attenuator 6 is passed to variable attenuator 7 which attenuates the signal by a factor representative of the Research octane coefficient $a$ which is predetermined at each refinery. The attenuated signal ($a\Delta RON$) is passed through buffer amplifier 8 to the input of Road octane summing amplifier 9. Buffer amplifier 8 provides electrical isolation between the attenuated voltage signal and summing amplifier 9, that is, it passes the voltage signal without drawing a significant amount of current from variable attenuator 7.

In a similar manner, an octane comparator having an ASTM knock engine operating under conditions approximating those specified in the ASTM Motor method is used to produce periodically available prototype and line gasoline Motor knock intensity voltage signals which are introduced at 10 and 11 respectively. These periodically available signals are converted to continuous prototype Motor knock intensity (PMKI) and line Motor knock intensity (LMKI) signals in memory amplifiers 12 and 13 and passed to differential amplifier 14 which produces a delta Motor knock intensity voltage signal ($\Delta MKI$). This signal is then attenuated by variable attenuator 15 which converts the knock intensity voltage signal to a delta Motor octane number voltage signal ($\Delta MON$). This signal is then passed to variable attenuator 16 which attenuates the signal by a factor representative of the Motor octane coefficient $b$ which is predetermined at each refinery. The attenuated signal ($b\Delta MON$) is passed through buffer amplifier 17 to the input of Road octane summing amplifier 9.

In general practice prototype gasolines are chosen for the Research and Motor octane comparators which are at or near the specification Motor and Research octane numbers. In the event that one or both of the prototype gasolines do not have the specification Research and Motor octane numbers, it is necessary to make a Road octane offset ($U_o$) adjustment to make the actual octane number of the prototype gasoline appear to be the specification value. For example, if the Road octane number calculated from the Research and Motor octane numbers of the prototype gasoline does not agree with the specification Road octane number, the Road octane offset is the difference in these values.

Any Road octane offset necessary is supplied by a voltage introduced at 18, adjusted to the desired value by means of variable attenuator 19 and sent to buffer amplifier 20. Although buffer amplifier 20 is not necessary to proper functioning of the computer, it provides increased flexibility as will be understood by those skilled in the art of electrical circuitry. Optionally, with or without amplification, the Road octane offset signal is sent to summing amplifier 9. Amplifier 9 algebraically sums the voltage signals received from buffer amplifiers 8, 17 and 20, thereby producing a delta Road octane voltage signal. Recorder 21 is an optional feature which provides means for monitoring the delta Road octane voltage signal visually or as a permanent record. When the delta Road octane voltage signal is controlling the blending operation, it passes through relays 22 and 23 to the blender. Depending on the sign and magnitude of the Road octane voltage signal, the blender increases, decreases or maintains constant the rate at which the component affecting octane quality is added to the gasoline.

The delta Research voltage signal is also supplied to Research octane summing amplifier 24. In those cases where the Research prototype gasoline does not have the specification Research octane number, it is necessary to make a Research octane offset adjustment ($R_o$) to make the actual Research octane number of the Research prototype gasoline appear to be the specification value. The Research octane offset voltage signal is supplied by a voltage source 25, adjusted to the desired value by means of variable attenuator 26, and sent to summing amplifier 24. After the offset adjustment has been made and the signals summed in amplifier 24, the resulting offset delta Research octane signal is sent to relay contacts 27.

The offset delta Research octane voltage signal is also sent to delta Research octane limit sensor 28 which can be a recorder having contacts at the ends of the scale or other means which indicate when preset limits have been reached. The recorder and the limit sensor can also be separate devices. In normal operation, when the Road delta octane singal from amplifier 9 is controlling the blending operation, relay contacts 22 and 23 are closed and relay contacts 27 are open; thus the delta Research octane voltage signal does not reach the blender. However, when limit sensor 28 has been programmed to respond to limits on the delta Research octane number and such limits are reached, the limit sensor opens relay contacts 22 and closes relay contacts 27 so that the blending operation will then be under the control of the offset delta Research octane signal. The relay contacts remain in this position until the computer is manually reset as previously described.

In a similar manner, the delta Motor octane voltage signal and any Motor octane offset value from voltage source 30 and variable attenuator 31 are summed in Motor octane summing amplifier 29 and sent to relay contacts 32. The offset delta Motor octane signal is also sent to delta Motor octane limit sensor 33. Whenever the delta Motor octane number reaches its preset limit, limit sensor 33 opens relay contacts 23 and closes relay contacts 32.

Numerous blending systems are available for use in combination with the delta Road octane computer of this invention. The chief requirements in their selection are that they be responsive to the voltage signal produced by the delta Road octane computer, either directly or through an appropriate converter, and that they be sufficiently sensitive to respond accurately to small changes in the voltage signal.

The electrical components used in the computer circuit of this invention are all commercially available. Amplifiers 3, 4, 5, 8, 12, 13, 14, 17, 20, 24 and 29 may be operational amplifiers of the transistorized, high gain type or of the vacuum tube circuit type.

The following example, illustrating typical operation of the computer of this invention, is given without any intention that the invention be limited thereto.

EXAMPLE

A delta Road octane computer having the electrical circuit illustrated in FIG. 2 is used in this example. It has been determined that operating conditions will be as as follows:

Research octane number

| | |
|---|---|
| Prototype gasoline | 95.0 |
| Low limit | 94.5 |
| Control to | 95.0 |

Motor octane number

| | |
|---|---|
| Prototype gasoline | 84.5 |
| Low limit | 84.0 |
| Control to | 84.0 |

Road octane number

| | |
|---|---|
| Target | 91.0 |
| Control to | 91.0 |

It has been determined that the relationship between the Research and Motor octane numbers and the Road octane number is in accordance with the equation $$UON = 0.5RON + 0.5MON + 1$$

Thus, $a=0.5$ and $b=0.5$. Variable resistors 7 and 16 are set at these values. Substituting the Research and Motor Octane numbers of the prototype gasoline in the equation, the calculated Road octane number is $$\frac{95.0}{2} + \frac{84.5}{2} + 1 = 90.75$$

Since the calculated Road octane number is different from the target Road octane number, a Road octane offset adjustment must be made.

Delta Road octane recorder 21 is a zero-center, potentiometric strip-chart pen recorder. Calibration of recorder 21 is carried out with the Research and Motor octane compartor signals removed. Using variable resistor 19, the marking pen or recorder 21 is centered. With the Road octane offset variable resistor 19 output adjusted to zero offset in this manner, the scale of the recorder is shifted so that the calculated Road octane number is 90.75 is in the center of the scale. Variable resistor 19 is then used to adjust the recorder scale so that it is centered at 91, the target Road octane number. Accordingly, the target delta Road octane number is 0.25 higher than the value calculated from the prototype gasoline used in the knock engines of the octane comparators.

Since the Research octane number will be controlled to 95, which is the Research octane number of the prototype gasoline, no Research octane offset adjustment is necessary. With the Research octane offset variable resistor 26 output adjusted to zero offset in the manner described for variable resistor 19, the recorder scale of Research octane limit sensor 28, which is also a zero-center, potentiometric strip-chart pen recorder, is centered at 95. The low limit cam on the limit sensor is set at 94.5 so that a switch is actuated by the cam when this limit is reached.

Since the Motor octane number will be controlled to the low limit of 84, a Motor octane offset adjustment must be made. With the Motor octane offset variable resistor 31 output adjusted to zero as before, the recorder scale of Motor octane limit sensor 33, which is also a zero-center, potentiometric strip-chart pen recorder, is centered at 84.5, the Motor octane number of the prototype gasoline. The scale is then adjusted with variable resistor 31 so that it is centered at 84, the value to which the Motor octane number will be controlled if its preset limit is reached. The low limit cam on the recorder of Motor octane limit sensor 33 is set at 84 so that a switch is actuated by the cam when this limit is reached. The delta Road octane computer is now ready to receive delta Research and Motor octane signals from the Research and Motor octane comparators.

The Research and Motor octane comparators are calibrated as follows. Two primary reference fuels, one having a Research octane number of 94 and the other having a Research octane number of 96, are used alternately in the knock engine of the Research octane comparator to obtain knock intensity voltage signals representative of these two primary reference fuels. These two knock intensity voltage signals are passed to differential amplifier 5 which determines the difference in knock intensity voltage to be 2 volts. Since it is decided to use one-half volt to represent one delta Research octane number, variable resistor 6 is adjusted to reduce the knock intensity signal by a factor of one-half. Thus, the resulting delta Research octane voltage signal representing a 2 Research octane number difference between the two reference fuels is 1 volt. In the same manner, the Motor octane comparator is calibrated so that each volt coming from variable resistor 15 represents two delta Motor octane numbers. The timing of the Research and Motor knock engines is then asynchronized so that their prototype and line gasoline cycles occur oppositely. The entire control system is now ready to control blending of the line gasoline.

Assuming a sample of line gasoline has a Research octane number of 95.2 and a Motor octane number of 85.1, the following voltage signals will be generated. Research differential amplifier 5 will determine the difference in voltage to be −0.2 volt. This voltage is attenuated by variable resistor 6 to give a delta Research octane voltage of −0.1. Variable resistor 7 attenuates this voltage to −0.05 volt and passes it through buffer amplifier 8 to Road octane summing amplifier 9. In a like manner a delta Motor octane signal of −0.3 volt is attenuated by variable resistor 16 which sends a signal of −0.15 volt to summing amplifier 9. Variable resistor 19 passes a Road octane offset voltage signal of +0.125 volt through buffer amplifier 20 to summing amplifier 9. Summing amplifier 9 then passes a signal of −0.075 volt to the blending system which decreases the amount of tetraethyl lead added to the line gasoline. As the difference between the Research and Motor octane numbers of the line and prototype gasolines is reduced, the delta Road octane number voltage signal approaches zero at which point the blending control valve remains stationary and the Road octane quality of the blend remains on target.

Although the invention has been described and exemplified by way of specific embodiments, it is not intended that it be limited thereto. As will be apparent to those skilled in the art, numerous modifications and variations of these embodiments can be made without departing from the spirit of the invention.

The embodiments of the invention in which an exclusive property or privilege is claimed are defined as follows:

1. A delta Road octane computer which comprises a variable attenuator for attenuating a delta Research octane voltage signal, a buffer amplifier for amplifying the attenuated delta Research octane voltage signal, a variable attenuator for attenuating a delta Motor octane voltage signal, a buffer amplifier for amplifying the attenuated delta Motor octane voltage signal, an independently variable voltage source, a Road octane summing amplifier for algebraically summing the attenuated and amplified delta Research and Motor octane voltage signals and the independently variable voltage signal, and an output terminal for receiving the output signal of the Road octane summing amplifier.

2. The computer of claim 1 which includes a Research octane summing amplifier for algebraically summing the delta Research octane voltage signal and an independently variable voltage signal, a Research octane limit sensor means for detecting when the output voltage signal of the Research octane summing amplifier reaches a preset voltage limit, switching means operatively connected to the Research octane limit sensor means for disconnecting the output signal of the Road octane summing amplifier from the output terminal while connecting the output signal of the Research octane summing amplifier to the output terminal whenever the output signal from the Research octane summing amplifier reaches the preset voltage limit, a delta Motor octane summing amplifier for algebraically summing the delta Motor octane voltage signal and an independently variable voltage singal, a Motor octane limit sensor means for detecting when the output voltage signal of the Motor octane summing amplifier reaches a preset voltage limit, and switching means operatively connected to the Motor octane limit sensor means for disconnecting the output signal of the Road octane summing amplifier from the output terminal while connecting the output signal of the Motor octane summing amplifier to the output terminal whenever the output signal from the Motor octane summing amplifier reaches the preset voltage limit.

3. The computer of claim 1 in which the variable attenuator for attenuating the delta Research octane voltage signal and the variable attenuator for attenuating the delta Motor octane voltage signal each receives its respective signal from a circuit which comprises a memory amplifier for sampling and holding a periodically available prototype gasoline knock intensity voltage signal, a memory amplifier for sampling and holding a periodically available line gasoline knock intensity voltage signal, a differential amplifier which produces a delta knock intensity voltage signal representative of the algebraic difference between the prototype gasoline knock intensity voltage signal and the line gasoline knock intensity voltage signal, and a variable attenuator for attenuating the voltage signal from the differential amplifier.

4. The computer of claim 2 in which the variable attenuator for attenuating the delta Research octane voltage signal and the variable attenuator for attenuating the delta Motor octane voltage signal each receives its respective signal from a circuit which comprises a memory amplifier for sampling and holding a periodically available prototype gasoline knock intensity voltage signal, a memory amplifier for sampling and holding a periodically available line gasoline knock intensity voltage signal, a differential amplifier which produces a delta knock intensity voltage signal representative of the algebraic difference between the prototype gasoline knock intensity voltage signal and the line gasoline knock intensity voltage signal, and a variable attenuator for attenuating the voltage signal from the difference amplifier.

5. A method of producing a voltage signal which is useful for controlling the octane quality of a gasoline blend containing at least one component which affects octane quality from a delta Research octane voltage signal and a delta Motor octane voltage signal which comprises attenuating the delta Research octane voltage signal by a factor representative of the Research octane coefficient, amplifying the attenuated delta Research octane voltage signal without drawing a significant amount of current from the attenuated delta Research octane voltage signal, attenuating the delta Motor octane voltage signal by a factor representative of the Motor octane coefficient, amplifying the attenuated delta Motor octane voltage signal without drawing a significant amount of current from the attenuated delta Motor octane voltage signal, algebraically summing the attenuated and amplified delta Research octane voltage signal, the attenuated and amplified delta Motor octane voltage signal and an independently variable voltage signal representative of the Road octane offset and passing the resulting delta Road octane voltage signal to an output terminal.

6. The method of claim 5 which includes the steps of algebraically summing the delta Research octane voltage signal and an independently variable voltage signal representative of the Research octane offset, monitoring the offset delta Research octane voltage signal, disconnecting the delta Road octane voltage signal from the output terminal while connecting the offset delta Research octane voltage signal to the output terminal whenever the offset delta Research octane voltage signal reaches a preset voltage limit, algebraically summing the delta Motor octane voltage signal and an independently variable voltage signal representative of the Motor octane offset, monitoring the offset delta Motor octane voltage signal, disconnecting the delta Road octane voltage signal from the output terminal while connecting the offset delta Motor octane voltage signal to the output terminal whenever the offset delta Motor octane voltage signal reaches a preset voltage limit.

7. The method of claim 5 in which the delta Research and Motor octane voltage signals are produced continuously from periodically available prototype and line gasoline Research knock intensity voltage signals and periodically available prototype and line gasoline Motor knock intensity voltage signals, respectively, by the method which comprises sampling and holding the periodically available prototype gasoline knock intensity voltage signal thereby producing a continuous prototype gasoline knock intensity voltage signal, sampling and holding the periodically available line gasoline knock intensity voltage signal thereby producing a continuous line gasoline knock intensity voltage signal, passing the continuous prototype and line gasoline knock intensity voltage signal to a differential amplifier which produces a delta knock intensity voltage signal representative of their algebraic difference in knock intensity voltage, and attenuating the delta knock intensity voltage signal by a factor necessary to convert the delta knock intensity voltage signal to a delta octane voltage signal.

8. The method of claim 6 in which the delta Research and Motor octane voltage signals are produced continuously from periodically available prototype and line gasoline Research knock intensity voltage signals and periodically available prototype and line gasoline Motor knock intensity voltage signals, respectively, by the method which comprises sampling and holding the periodically available prototype gasoline knock intensity voltage signal thereby producing a continuous prototype gasoline knock intensity voltage signal, sampling and holding the periodically available line gasoline knock intensity voltage signal thereby producing a continuous line gasoline knock intensity voltage signal, passing the continuous prototype and line gasoline knock intensity voltage signals to a differential amplifier which produces a delta knock intensity voltage signal representative of their algebraic difference in knock intensity voltage, and attenuating the delta knock intensity voltage signal by a factory necessary to convert the delta knock intensity voltage signal to a delta octane voltage signal.

References Cited

UNITED STATES PATENTS 3,025,500   3/1962   Taback _____ 235—193 X

OTHER REFERENCES

"Analysis of Problems in Dynamics by Electronic Circuits," J. R. Ragazzini et al., "Institute of Radio Engineers," Proceedings, vol. 35, No. 5, pp. 444–446, May 1947.

"Comparator Provides Closer Octane Control," J. E. Riegel, The Oil and Gas Journal, vol. 63, No. 43, pp. 134–138, Oct. 25, 1965.

MALCOLM A. MORRISON, Primary Examiner

J. F. RUGGIERO, Assistant Examiner

U.S. Cl. X.R.

235—151.3